United States Patent [19]

Shalaby

[11] 4,190,720
[45] Feb. 26, 1980

[54] ISOMORPHIC COPOLYMERS OF ε-CAPROLACTONE AND 1,5-DIOXEPAN-2-ONE

[75] Inventor: Shalaby W. Shalaby, Lebanon, N.J.

[73] Assignee: Ethicon, Inc., Somerville, N.J.

[21] Appl. No.: 972,757

[22] Filed: Dec. 26, 1978

[51] Int. Cl.$^2$ .............................................. C08G 63/08
[52] U.S. Cl. ...................................... 528/354; 128/90
[58] Field of Search ........................................ 528/354

[56] References Cited

U.S. PATENT DOCUMENTS

| | | | |
|---|---|---|---|
| 3,190,858 | 6/1965 | Cox et al. | 260/78.3 |
| 3,645,941 | 2/1972 | Snapp et al. | 260/18 |
| 3,852,913 | 12/1974 | Clendinning et al. | 47/37 |
| 4,045,418 | 8/1977 | Sinclair | 260/78.3 R |

FOREIGN PATENT DOCUMENTS 1272733  5/1972  United Kingdom.

OTHER PUBLICATIONS

Union Carbide Corporation, New Product Information Bulletin, "Polycaprolactone Polymer PCL-700" F44221, Nov. 1972.

*Primary Examiner*—Earl A. Nielsen
*Attorney, Agent, or Firm*—Wayne R. Eberhardt

[57] ABSTRACT

Isomorphic copolymers of ε-caprolactone with from about 3 to 15 percent 1,5-dioxepan-2-one have melting points in the range of 54° to 66° C. and may be extruded into fibers having elongations in the range of 120 to 235 percent. The copolymers are useful for the preparation of filaments, films and molded articles for general and surgical applications including surgical sutures and casts.

12 Claims, No Drawings

ISOMORPHIC COPOLYMERS OF ε-CAPROLACTONE AND 1,5-DIOXEPAN-2-ONE

BACKGROUND OF THE INVENTION

This invention relates to copolymers of lactones and ether lactones, and, more particularly, to copolymers of ε-caprolactone with 1,5-dioxepan-2-one. The copolymers of the present invention are characterized by significantly lower melting points than comparable homopolymers of polycaprolactone, making such copolymers particularly desirable for use in temperature sensitive applications such as forming medical casts for broken bones.

The copolymers of the present invention can be processed into fibers, films and sheets. The fibers are characterized by having significantly higher elongation and tensile strength values than comparable homopolymers of caprolactone. Such fibers are useful as surgical sutures and in a variety of other textile and medical applications.

Homopolymers and various copolymers of caprolactone are well-known in the art. Monomers of 1,5-dioxepan-2-one and their utility for the production of polymers which can be used in resins, fibers, plastics, adhesives and surface coatings are also known as disclosed, for example, in British Pat. No. 1,272,733. The specific copolymers of the present invention and the novel properties thereof have not, however, been suggested in the prior art.

SUMMARY

The novel compositions of the present invention comprise isomorphic copolymers of ε-caprolactone with from about 3 to 15 percent 1,5-dioxepan-2-one. Purified monomers are reacted in the presence of a catalyst and at elevated temperatures to obtain a copolymer product having an inherent viscosity in excess of 1.5. The copolymers of the present invention have melting points as low as 54° C., as compared to 70° C. for comparable homopolymers of caprolactone. Fibers prepared from the copolymers by melt extrusion have elongations as high as 235 percent, as compared to about 124 percent for comparable homopolymers of caprolactone.

DESCRIPTION OF PREFERRED EMBODIMENTS

The isomorphic copolymers of the present invention are prepared by the random polymerization of purified ε-caprolactone with from about 3 to 15 percent by weight of 1,5-dioxepan-2-one monomer in the presence of an organometallic catalyst such as stannous octoate. The copolymers have a high degree of crystallinity, at least about 40 percent as a result of the sequential isomorphism associated with the polymer chain. The crystallinity of the copolymers of the present invention is comparable to that of ε-caprolactone homopolymer.

The preparation of the copolymers of the present invention is specifically illustrated by the Examples presented hereafter. In the Examples, inherent viscosity ($\eta_{inh}$) was obtained on solutions of polymer or fiber (1 g per liter) in hexafluoroisopropanol (HFIP) at 25° C. Melting temperatures ($T_m$) were determined by remelting on a DuPont 990 DSC apparatus using 5 mg samples of polymer and heating at a rate of 10° C. per minute under nitrogen. Crystallinity was determined by the method of Hermanns and Weidinger using a DuPont 310 curve analyzer.

Continuous filaments were prepared by melt extruding the polymer in a conventional manner, and the filaments were drawn 6X at room temperature to achieve molecular orientation. The drawn filaments were evaluated for straight tensile strength, knot strength, elongation and Young's modulus following conventional, single-filament textile testing procedures.

EXAMPLE I

Poly-ε-Caprolactone Control Polymer

ε-Caprolactone was purified by vacuum distillation to 99.9+ percent as determined by gas chromatography. The purified lactone (22.8 g, 0.20 mole) and a catalytic amount of stannous octoate (0.06 ml of 0.33 M toluene solution, 0.020 mmole) were heated in a sealed ampul, equipped for magnetic stirring, for 22 hrs at 170° C. The polymer was isolated and melt spun into continuous filaments. The properties of the polymer and filaments are presented in Table I.

EXAMPLE II

95/5 Isomorphic Copolyester of ε-Caprolactone and 1,5-Dioxepan-2-One

Purified ε-caprolactone (21.7 g, 0.190 mole), 1,5-dioxepan-2-one (1.16 g, 0.010 mole) and a catalytic amount of stannous octoate (0.06 ml of 0.33 M toluene solution, 0.020 mmole) were heated in a sealed ampul, equipped for magnetic stirring, for 22 hrs at 170° C. The polymer was isolated, and melt spun into continuous filaments. The properties of the polymer and drawn filaments are presented in Table I.

EXAMPLE III

90/10 Isomorphic Copolyester of ε-Caprolactone and 1,5-Dioxepan-2-One

Purified ε-caprolactone (25.65 g. 0.225 mole), 1,5-dioxepan-2-one (2.93 g, 0.025 mole), and a catalytic amount of stannous octoate (0.07 ml of 0.33 M solution in toluene, 0.025 mmole) were heated in a magnetically-stirred, sealed ampul at 760 mm nitrogen according to the following scheme: 16 hrs at 100° C., 8 hrs at 150° C., and 18 hrs at 170° C. The polymer was isolated and melt spun into continuous filaments. The properties of the polymer and drawn filaments are presented in Table I.

EXAMPLE IV

85/15 Isomorphic Copolyester of ε-Caprolactone and 1,5-Dioxepan-2-One

Purified ε-caprolactone (19.4 g, 0.170 mole), 1,5-dioxepan-2-one (3.48 g, 0.030 mole) and a catalytic amount of stannous octoate (0.06 ml of 0.33 M toluene solution, 0.020 mmole) were heated in a sealed ampul, equipped for magnetic stirring, for 22 hrs at 170° C. The polymer was isolated and melt spun into continuous filaments. The properties of the polymer and drawn filaments are presented in Table I.

TABLE I

| | Example No. | | | |
|---|---|---|---|---|
| | I | II | III | IV |
| POLYMER | | | | |
| ε-Caprolactone/ 1,5-dioxepan-2-one | 100/0 | 95/5 | 90/10 | 85/15 |
| $\eta_{inh}$ | 1.80 | 1.82 | 1.57 | 1.66 |
| $T_m$, °C., DSC, reheating | 70 | 66 | 54 | 56 |

TABLE I-continued

| | Example No. | | | |
|---|---|---|---|---|
| | I | II | III | IV |
| FIBER | | | | |
| Diameter, mils | 8.6 | 7.6 | 7.0 | 6.8 |
| Tensile strength, psi | 44,800 | 57,300 | 54,500 | 44,100 |
| Knot strength, psi | 37,900 | 35,300 | 36,300 | 44,100 |
| Elongation, % | 124 | 235 | 173 | 120 |
| Young's modulus, psi | 95,000 | 105,000 | 106,000 | 118,000 |
| $\eta_{inh}$ | 1.90 | 1.81 | 1.77 | 1.66 |
| Crystallinity, % | 40 | 42 | 43 | 42 |

As illustrated by the preceding Examples, the copolymers of the present invention afford a means by which the melting point of polycaprolactone may be depressed while maintaining a high degree of polymer crystallinity, thereby improving the physical properties of the filaments produced therefrom. Filaments comprising copolymers containing 3 to 10 percent, 1,5-dioxepan-2-one are characterized by elongations in excess of 150 percent and tensile strengths in excess of 50,000 psi. A remarkable increase in filament elongation and tensile strength is observed with incorporation of only 5 percent, 1,5-dioxepan-2-one comonomer, with these values decreasing as the amount of comonomer is increased. A minimum polymer melting point of 54° C. is observed at 10 percent 1,5-dioxepan-2-one.

The 90/10 copolymer of ε-caprolactone and 1,5-dioxepan-2-one is a particularly preferred composition for use in medical applications such as surgical sutures and casts because of its very low melting point and excellent physical properties.

Copolymers containing an excess of 15 percent 1,5-dioxepan-2-one may be prepared and used in molding applications although physical properties of such polymers are generally inferior to those compositions containing 3 to 15 percent 1,5-dioxepan-2-one, especially in the form of filaments.

Thermo-formable medical devices such as casts for broken limbs may be constructed of woven or nonwoven fibrous mats and/or films or sheets of the copolymers of the present invention. Such devices may be heated to near the melting point, formed around the broken limb with no thermal damage to the patient, and allowed to cool whereupon the device becomes rigid and provides mechanical support for the broken limb.

What is claimed is:

1. An isomorphic copolymer of ε-caprolactone with from about 3 to 15 percent by weight 1,5-dioxepan-2-one.
2. A copolymer of claim 1 having an inherent viscosity greater than about 1.4.
3. A copolymer of claim 1 having a melting point of less than 70° C.
4. A copolymer of claim 1 having a crystallinity of at least about 40 percent.
5. A copolymer of claim 1 containing about 10 percent by weight 1,5-dioxepan-2-one and having a melting point of about 54° C.
6. A filament comprising a copolymer of claim 1.
7. A filament of claim 6 having a melting point of less than 70° C.
8. A filament of claim 6 comprising a copolymer containing from about 3 to 10 percent 1,5-dioxepan-2-one and having an elongation in excess of 150 percent.
9. A filament of claim 6 comprising a copolymer containing about 10 percent by weight 1,5-dioxepan-2-one.
10. A filament of claim 9 having a melting point of about 54° C.
11. A film comprising a copolymer of claim 1.
12. A molded article comprising a copolymer of claim 1.

* * * * *